United States Patent Office 3,545,852
Patented Dec. 8, 1970

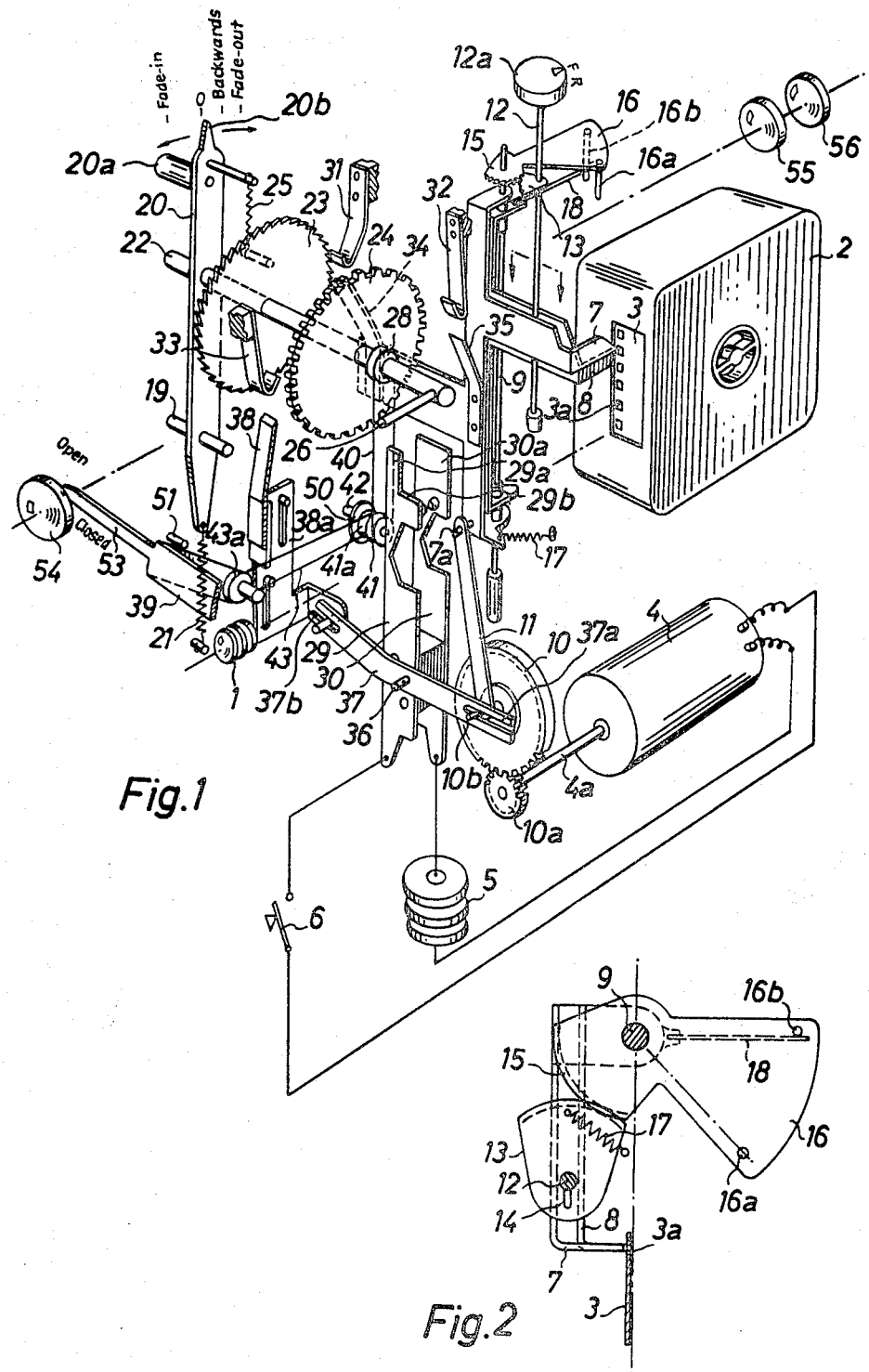

3,545,852
MOTION PICTURE CAMERA
Alfred Winkler, Munich, Germany, and Richard Denk, Bad Voeslau, Austria, assignors to Agfa-Gevaert Aktiengesellschaft, Leverkusen, Germany
Filed Feb. 1, 1968, Ser. No. 702,383
Claims priority, application Germany, Feb. 4, 1967, A 54,817
Int. Cl. G03b 21/36
U.S. Cl. 352—91                19 Claims

ABSTRACT OF THE DISCLOSURE

A motion picture camera for making fade-in and fade-out shots comprises an electric motor which drives a reversible film transporting mechanism. When the camera is set to make fade-out shots, an arresting device opens a control switch in the motor circuit after the transporting mechanism advances a predetermined length of film and while an auxiliary diaphragm moves gradually into the path of incoming light. The arresting device opens the control switch upon completed transport of an identical length of film when the transporting mechanism is set to move the film backwards, and the diaphragm moves gradually away from the path of incoming light when the film is thereupon transported forwardly during fade-in.

BACKGROUND OF THE INVENTION

The present invention relates to motion picture cameras in general, and more particularly to improvements in 8-millimeter motion picture cameras which can be utilized to make effect shots known as fade-in and fade-out.

It is already known to provide an 8-millimeter motion picture camera with a diaphragm or mask which can be utilized to produce fade-in and fade-out. As a rule, such cameras are provided with a frame counter which must be observed by the operator during fade-out to make sure that the same length of film is transported backwards prior to fade-in. Such method is complicated and inaccurate because it is very difficult to read the counter with a degree of accuracy required to insure that the length of film during fade-in is identical with the length of film during fade-out. Certain motion picture cameras with spring motor and rewinding lever are already provided with automatic blocking devices which arrest the motor and/or the lever in response to transport of a predetermined length of film. A drawback of such blocking devices is that they cannot be employed in cameras wherein the film transporting mechanism derives motion from an electric motor.

SUMMARY OF THE INVENTION

It is an object of our invention to provide a simple, compact and inexpensive motion picture camera wherein the film transporting mechanism is driven by an electric motor, which is capable of making fade-in and fade-out shots, and wherein the length of film which is transported forwardly during fade-out is invariably identical with that length of film which is transported backwards preparatory to making a fade-in shot, or vice versa.

Another object of the invention is to provide a motion picture camera of the just outlined character wherein the mechanism which insures such accurate determination of film lengths during forward and backward transportation of film can perform other important functions, particularly that of moving a diaphragm during fade-in or fade-out.

A further object of the invention is to provide a mechanism of the just outlined character which derives motion from the electric motor of the motion picture camera.

An additional object of the invention is to provide a motion picture camera which can make fade-in and fade-out shots and which is sufficiently simple and rugged to be useful to amateur photographers as well as to skilled professionals.

The invention is embodied in a motion picture camera which is designed to make fade-in and fade-out shots. The camera comprises electric motor means, film transporting means operatively connected with the motor means and arranged to transport the film forwardly or backwards at the will of the operator, diaphragm means arranged to respectively move away from and into the path of incoming light during fade-in and fade-out while the film is transported forwardly, and control means for arresting the motor means in response to transport of predetermined film lengths during fade-out and backwards preparatory to fade-in or vice versa. The control means comprises normally closed control switch means in circuit with the motor means, arresting means movable through a predetermined distance from a neutral position to an operative position to thereby open the control switch means, motion transmitting means operatively connected with the motor means and/or film transporting means and connectable with the arresting means to move the latter to operative position, and selector means for connecting the motion transmitting means with the arresting means at the will of the operator.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary perspective view of a motion picture camera which embodies our invention; and FIG. 2 is an enlarged top plan view of the film transporting mechanism in the camera of FIG. 1.

DESCRIPTION OF THE PREFERRED EMBODIMENTS

FIG. 1 illustrates a portion of a motion picture camera comprising an objective lens system 1 which can include an automatic main diaphragm capable of providing a range of apertures as a function of scene brightness. A magazine or cassette 2 contains a supply of motion picture film 3 which is provided with a row of perforations 3a. An electric motor 4 serves to effect transport of film 3 and to drive a customary rotary shutter assembly (not shown). The motor 4 is connected in circuit with a source of electrical energy including a stack of batteries 5 and a master switch 6. The latter can be closed by a customary trigger, not shown.

The film transporting mechanism of the camera derives motion from the output shaft 4a of the electric motor 4 and includes two film transporting members here shown as pulldown levers 7, 8. The claws of these levers can enter the perforations 3a to respectively advance the film 3 in forward and backward direction. The levers 7, 8 are reciprocable together along a vertical axis defined by a shaft 9 and are reciprocated by a crank drive including a gear 10a on the output shaft 4a, a gear 10 mounted on an intermediate shaft and meshing gear 10a, an eccentric crank pin 10b on the gear 10, and a connecting rod 11 which connects the pin 10b with a pin 7a of the pulldown lever 7. The levers 7, 8 reciprocate along the shaft 9 as a unit but are turnable with reference to each other about the axis of this shaft. An actuating device includes a knob 12a which is outwardly adjacent to the housing of the camera and has a stem 12 which carries a toothed segment 13 and an eccentric projection 14 (see FIG. 2). The segment 13 meshes with a second toothed segment 15 which is turnable on the shaft 9 and is rigid with an arm or extension 16 having two displacing posts 16a, 16b. A resilient element here shown as a helical spring 17 biases the claw of the pulldown lever 7 against the film 3. The pulldown lever 8 has a claw which is shorter than the claw of the lever 7 but is substantially mirror symmetrical with reference thereto. The lever 8 is connected with a leaf spring 18 which engages with the displacing post 16b when the actuating knob 12a sets the film transporting mechanism for forward operation, i.e., when the claw of the lever 7 is permitted to advance the film 3 stepwise in a downward direction, as viewed in FIG. 1. The spring 17 is then free to bias the claw of the lever 7 in a direction toward the film 3 so that the horizontal flank of its claw enters a perforation 3a and entrains the film during downward movement and the upwardly inclined flank of the claw slides along the film and enables the claw to enter the next perforation 3a when the lever 7 moves upwardly. The displacing post 16b on the extension 16 of the toothed segment 15 then holds the leaf spring 18 in a position in which the latter keeps the claws of the lever 8 away from the film 3. In order to move the film backwards, the user turns the knob 12a in a clockwise direction whereby the segment 13 on the stem 12 turns the segment 15 in a counterclockwise direction, as viewed in FIG. 2, and causes the displacing post 16a to engage and to deflect the leaf spring 18 in a sense to move the claw of the lever 8 into engagement with the film 3. The eccentric projection 14 then turns the lever 7 in a clockwise direction, as viewed in FIG. 2, and causes the claw of the lever 7 to move away from the film 3. The leaf spring 18 then performs the same function as the helical spring 17, i.e., it biases the claw of the lever 8 against the film so that the claw can move the film upwardly, as viewed in FIG. 1 when the master switch 6 is closed and the circuit of the motor 4 is completed by way of a control switch which will be described later. The user rotates the knob 12a in a counterclockwise direction (back to the position shown in FIG. 1) when the film 3 is to be transported again by the claw of the lever 7. The direction of rotation of the output shaft 4a of the motor 4 is the same, regardless of whether the film is transported forwardly by the claw of lever 7 or backwards by the claw of the lever 8.

A very important object of the present invention is to provide a camera wherein a predetermined length of film 3 is transported forwardly during fade-out and wherein an identical length of film is transported backwards prior to fade-in, namely, when the index of the knob 12a registers wtih the graduation R shown at the top of FIG. 1 so that the film 3 is being transported by the claw of the lever 8. The control means for insuring such transport of film 3 includes a selector lever 20 which is pivotable about a fixed pin 19 and is biased by a spring 21 which tends to maintain it in a zero position. The selector 20 has an upper end portion or arm 20b which is accessible to the user of the camera and simultaneously serves as an index or marker by being movable along a fixed scale shown in the upper left-hand portion of FIG. 1. If the selector 20 is moved from zero position in a clockwise direction, as viewed in FIG. 1, it reaches first an intermediate position (marked "backwards") and thereupon a first end position (marked "backwards") and thereupon a first end position (marked "fade-out"). When moved from zero position in a counterclockwise direction, the selector 20 assumes a second end position (marked "fade-in"). The upper arm of the selector 20 serves as a bearing for one end portion of a horizontal arresting shaft 22 which is rotatable with respect thereto and carries two toothed wheels 23, 24. The wheel 23 is an arresting wheel and is rigid with the arresting shaft 22 but the wheel 24 is rotatable relative to this arresting shaft. A helical resetting spring 25 couples the selector 20 with the arresting wheel 23 and tends to maintain the latter in a neutral position which is shown in FIG. 1. An arresting pin or trip 26 is rigid with the righthand end portion of the arresting shaft 22, i.e., it shares all angular movements of the arresting wheel 23.

The aforementioned control switch includes two contacts 29, 30 which engage with each other to close the control switch when the selector 20 is held in the zero position. Thus, when the selector 20 assumes such zero position and the user of the camera depresses the trigger to close the master switch 6, the circuit of the motor 4 is completed and the crank drive 10, 10a, 10b, 11 drives the pulldown levers 7, 8 to advance the film 3 in forward direction provided that the knob 12a is held in the illustrated position in which its index registers with the symbol F. The motor 4 also rotates the shutter. The contact 29 has a projection or lug 29a and a cut out or notch 29b which is adjacent to the lug 29a. The position of the notch 29b is such that it permits the arresting trip 26 to bypass the contact 29 when the trip is caused to turn with the arresting wheel 23 in a counterclockwise direction, as viewed in FIG. 1. The trip 26 then moves adjacent to the lug 29a and engages the projection or lug 30a of the contact 30 to disengage the latter from the contact 29 and to open the control switch, i.e., to arrest the motor 4. The motor 4 is arrested even if the master switch 6 is closed. If the resetting spring 25 is thereupon permitted to rotate the arresting means 22, 23, 26 in a clockwise direction and back to the neutral position shown in FIG. 1, the trip 26 moves away from the lug 30a and allows the control switch to close because the contact 30 is permitted to re-engage the contact 29.

The housing of the camera carries three resilient blocking members 31, 32, 33. The blocking member 31 engages one tooth of the arresting wheel 23 when the selector 20 assumes the first end position ("fade-out") and the intermediate position ("backwards") to prevent rotation of the wheel 23 in a clockwise direction but to permit rotation of this wheel in a counterclockwise direction. The blocking member 32 engages a tooth of the wheel 24 and holds the latter against rotation in a clockwise direction when the selector 20 assumes the first end position ("fade-out"). When the selector 20 is held in zero position or in the intermediate position, the blocking member 32 is disengaged from the wheel 24. When the selector 20 is moved to the second end position ("fade-in"), the blocking member 33 engages a tooth of the wheel 24 and holds the latter against rotation in a counterclockwise direction.

The means for transmitting motion to the wheels 23, 24 comprises two pawls 34, 35 which are connected with and share reciprocatory movements of the pulldown lever 7 along the shaft 9. A third motion transmitting pawl 38 is driven by a two-armed lever 37 which is turnable on a fixed pivot pin 36 and has a first arm provided with a slot 37a receiving a portion of the pin 10b on the gear 10. A second arm of the lever 37 has a slot 37b for a pin provided on a vertically reciprocable slide or carriage 38a which is rigid with the third pawl 38 and is guided by pins mounted on the housing of the camera. The transmission ratio of the lever 37 is such that the pawl 38 moves up and down to the same exxtent and at the same time as the pulldown lever 7.

When the selector 20 is held in zero position, the pawls 34, 35, 38 are disengaged from the wheels 23, 24. In order to prepare the camera for a fade-out shot, the user first moves the selector 20 to the first or right-hand end position and holds the selector in such end position. The upper arm of the selector 20 then moves the arresting shaft 22 in a clockwise direction and causes the wheels 23, 24 to respectively engage with the pawls 34, 35 and with blocking members 31, 32, which latter hold these wheels against rotation in a clockwise direction. The user then actuates the trigger to close the master switch 6 whereby the motor 4 drives the pulldown levers 7, 8 and the lever 7 transports the film 3 downwardly because the actuating knob 12a is assumed to stay in the position shown in FIG. 1. The pawls 34, 35 rotate the wheels 23, 24 in a counterclockwise direction whereby the wheel 23 rotates the arresting shaft 22 and trip 26 so that the latter moves through the notch 29b of the contact 29 and engages the lug 30a of the contact 30 to open the control switch and to arrest the motor 4 after the lever 7 completes the transport of a predetermined length of film 3 in forward direction. The just mentioned length of film 3 contains a predetermined number of frames. During such forward transport of film 3, an auxiliary diaphragm 39 is gradually moved into the path of incoming light in a manner to be described later so that the diaphragm 39 gradually reduces the amount of light which can reach the film frames during rotation of wheels 23, 24 in a counterclockwise direction. Rotation of the wheel 23 from neutral position causes the resetting spring 25 to store energy.

The next step is rewinding or backward transportation of film 3 by the same length as during counterclockwise rotation of wheels 23 and 24. This is achieved by turning the knob 12a in a clockwise direction so as to place its index into registry with the symbol R whereby the displacing post 16a of the extension 16 engages the spring 18 and causes the claw of the pulldown lever 8 to move into engagement with the film 3. At the same time, the eccentric projection 14 of the stem 12 causes the pulldown lever 7 to move its claw away from the film against the opposition of the spring 17. Prior to resetting of the knob 12a, the user returns the selector 20 to zero position so that the wheels 23, 24 are disengaged from the blocking members 31, 32 and the resetting spring 25 is free to move the arresting means 22, 23, 26 back to neutral position shown in FIG. 1 whereby the trip 26 moves away from the lobe 30a and allows the control switch to close. The user thereupon moves the selector 20 to the intermediate position ("backwards") whereby the arresting wheel 23 engages with the blocking member 31 and pawl 34, i.e., the pawl 34 can rotate the arresting wheel in a counterclockwise direction. Such rotation begins when the user closes the master switch 6 whereby the motor 4 causes the pulldown lever 8 to transport the film 3 backwards (upwardly, as viewed in FIG. 1) but only to the same extent as during previous setting of the selector in the first end position ("fade-out") because the trip 26 opens the control switch again by striking against the lug 30a of the contact 30 when the film is moved backwards by the same number of frames as during previous transport by the claw of the lever 7. A friction clutch 50 holds the wheel 24 against rotation with the arresting wheel 23 when the selector 20 is held in the intermediate position ("backwards"). The final step is carried out for the purpose of making a fade-in shot while the film is being transported forwardly in the normal way, i.e., by the claw of the pulldown lever 7. Thus, the actuating knob 12a must be returned to the position shown in FIG. 1 so that the claw of the lever 8 is disengaged from the film 3 and the claw of the lever 7 returns to operative position. Prior to describing further stages of this last step, reference will be had to the aforementioned auxiliary diaphragm 39. The wheel 24 forms part of operating means for the diaphragm 39 and is rigid with a small pulley or sheave 28 for an endless cord or belt 40 which can drive a second sheave 41. The latter is rotatable on a shaft 42 which carries a third sheave 41a adapted to receive motion from the sheave 41 by way of the aforementioned friction clutch 50. Thus, the sheaves 41, 41a can rotate on the shaft 42 and can rotate in unison under the action of the belt 40 when the friction clutch 50 is capable of transmitting torque from the sheave 41 to the sheave 41a. The latter can drive a second endless belt or cord 43 which serves to move the auxiliary diaphragm 39 into and away from the path of incoming light. When the wheel 24 rotates in a counterclockwise direction, the belt 43 causes the diaphragm 39 to turn in a counterclockwise direction with a sheave 34a and to move gradually into the path of incoming light, i.e., in front of the objective lens system 1. When the film is transported in rearward direction to effect backward movement of a predetermined length in a manner as described above, the wheel 23 rotates but the wheel 24 is idle so that the diaphragm 39 remains in front of the lens system 1 and prevents the light from reaching the film or at least reduces the amount of such light. The selector 20 is then moved to the second end position ("fade-in") by turning about the pivot pin 19 in a counterclockwise direction, as viewed in FIG. 1. This moves the wheel 24 into engagement with the pawl 38 which receives motion from the lever 37 as soon as the user closes the master switch 6. The resetting spring 25 returns the arresting wheel 23 to neutral position. As the pawl 38 rotates the wheel 24 in a clockwise direction, the transmission including the sheaves 28, 41, 41a, 43a, friction clutch 50, and belts 40, 43 causes the diaphragm 39 to move gradually from the path of incoming light because the wheel 24 rotates in a clockwise direction. If the user fails to release the selector 20 when the wheel 24 ceases to move the diaphragm 39 back to the inoperative position of FIG. 1, this has no effect upon the exposure of fresh film frames because the diaphragm 39 is then arrested in inoperative position by a stop 51. When released by the user's finger, the selector 20 returns to zero position under the action of spring 21. The arresting wheel 23 also assumes its neutral position under the action of resetting spring 25. Thus, the angular position of the wheel 24 has no effect on operation of the camera when the diaphragm 39 abuts against the stop 51. The arresting trip 26 insures that the number of film frames is the same when the film moves in forward direction in the first end position of the selector 20 and when the film moves backwards in the intermediate position of the selector.

The diaphragm 39 has a portion or arm 53 which is visible in the viewfinder (the latter includes the lenses 54, 55 and 56). The latter can be provided with symbols ("open" and "closed") to indicate the position of the diaphragm 39 to the person looking through the viewfinder.

The improved camera is susceptible of many modifications with departing from the spirit of the present invention. For example, the operating wheel 24 can be arranged to open and close the main diaphragm in addition to the auxiliary diaphragm 39. Furthermore, the film transporting mechanism with the mirror symmetrical pulldown levers 7, 8 can be replaced by other mechanisms which are capable of transporting the film forwardly or backwards without changing the direction of rotation of the output shaft 4a. Also, the film transporting mechanism including the levers 7, 8 can be used in other types of motion picture cameras which may but need not be provided with means for making fade-in nad fade-out shots.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is:

1. In a motion picture camera which is adapted to make fade-in and fade-out shots, a combination comprising electric motor means; film transporting means operatively connected with said motor means and movable to transport the film forwardly or backwards at the will of the operator; diaphragm means arranged to respectively move away from and into the path of incoming light during fade-in and fade-out while the film is transported forwardly; control means for arresting said motor means in response to transport of predetermined film lengths during fade-out and backwards preparatory to fade-in or vice versa, comprising normally closed control switch means in circuit with said motor means, arresting means movable through a predetermined distance from a neutral position to an operative position to thereby open said switch means, motion transmitting means receiving motion from said film transporting means and connectable with said arresting means to move the latter to operative position, and selector means for connecting said motion transmitting means with said arresting means at the will of the operator; and resetting means for returning said arresting means to neutral position in response to disengagement of said motion transmitting means from said arresting means.

2. A combination as defined in claim 1, wherein said control switch means comprises a first contact and a movable second contact which normally engages said first contact, said first contact having a cutout and said arresting means comprising a trip which is rotatable from said neutral position to said operative position to thereby move through said cutout and to thereupon disengage said second contact from said first contact.

3. A combination as defined as claim 1, wherein said resetting means comprises spring means which stores energy during movement of said arresting means from neutral position.

4. A combination as defined in claim 1, further comprising operating means for gradually moving said diaphragm means into or away from the path of incoming light during movement of said arresting means from neutral to operative position.

5. A combination as defined in claim 4, wherein said operating means comprises a friction clutch.

6. A combination as defined in claim 4, further comprising viewfinder means, said diaphragm means comprising a portion which is observable in said viewfinder means to indicate the position of said diaphragm means.

7. In a motion picture camera which is adapted to make fade-in and fade-out shots, a combination comprising electric motor means; film transporting means operatively connected with said motor means and arranged to transport the film forwardly and backwards at the will of the operator; diaphragm means arranged to respectively move away from and into the path of incoming light during fade-in and fade-out while the film is transported forwardly; control means for arresting said motor means in response to transport of predetermined film lengths during fade-out and backwards preparatory to fade-in or vice versa, comprising normally closed control switch means in circuit with said motor means, arresting means movable through a predetermined distance from a neutral position to an operative position to thereby open said switch means, motion transmitting means operatively connected with said motor means and connectable with said arresting means to move the latter to operative position, and selector means for connecting said motion transmitting means with said arresting means at the will of the operator, said arresting means comprising a shaft, a wheel rigid with said shaft and a trip rigid with said shaft, said selector means comprising a lever pivotable about a fixed axis from a zero position in which said arresting means is disengaged from said motion transmitting means to at least one second position in which said motion transmitting means rotates said wheel to thereby move said trip into engagement with and to open said switch means in response to a predetermined angular displacement of said wheel from neutral position; and operating means for gradually moving said diaphragm means into or away from the path of incoming light during movement of said arresting means from neutral to operative position.

8. A combination as defined in claim 7, wherein said operating means comprises a second wheel rotatable on said shaft, and second motion transmitting means for rotating said second wheel with said first mentioned wheel during fade-in and fade-out.

9. A combination as defined in claim 8, wherein each of said motion transmitting means comprises a pawl connected with said film transporting means and cooperating with teeth provided on the respective wheel.

10. A combination as defined in claim 9, wherein said lever is pivotable to at least two second positions in one of which each of said pawls engages with the respective wheel and in another of which only the pawl of said first mentioned motion transmitting means engages with said first mentioned wheel to rotate the latter from neutral position while the film transporting mechanism is set to transport the film backwards.

11. A combination as defined in claim 10, further comprising third motion transmitting means receiving motion from said motor means to rotate said second wheel in a direction counter to that in which said second wheel is rotated by said second motion transmitting means in a further position of said lever.

12. A combination as defined in claim 8, further comprising first blocking means for holding said first mentioned wheel against rotation in one direction during fade-out and during backward transport of film, second blocking means for holding said second wheel against rotation in said one direction during fade-out, and third blocking means for holding said second wheel against rotation in opposite direction during fade-in.

13. A combination as defined in claim 8, wherein said operating means further comprises transmission means for moving said diaphragm means into the path of incoming light in response to rotation of said second wheel in one direction and for moving said diaphragm means away from the path of incoming light in response to rotation of said second wheel in the opposite direction.

14. A combination as defined in claim 7, wherein said lever is pivotable to three second positions and further comprising means for biasing said lever to zero position.

15. A combination as defined in claim 14, wherein said lever is pivoted to one of said second positions prior to forward transport of film during fade-in, to another second position prior to forward transport of film during fade-out, and to a further second position prior to backward transport of film.

16. In a motion picture camera which is adapted to make fade-in and fade-out shots, a combination comprising electric motor means; film transporting means operatively connected with said motor means and arranged to transport the film forwardly or backwards at the will of the operator, said film transporting means comprising two film transporting members one of which is arranged to move the film forwardly and the other of which is arranged to move the film backwards, and actuating means for moving one of said members into engagement with the film when the other member is disengaged from film and vice versa; diaphragm means arranged to respectively move away from and into the path of incoming light during fade-in and fade-out while the film is transported forwardly; and control means for arresting said motor means in response to transport of predetermined film lengths during fade-out and backwards preparatory to fade-in or vice versa, comprising normally closed control switch means in circuit with said motor means, arresting means movable through a predetermined distance from a neutral position to an operative position to thereby open said switch means, motion transmitting means operatively connected with said motor means and connectable with said arresting means to move the latter to operative position, and selector means for connecting said motion transmitting means with said arresting means at the will of the operator.

17. A combination as defined in claim 16, wherein said film transporting members are turnable with reference to each other about a predetermined axis and further comprising means driven by said motor means for reciprocating said members along said predetermined axis.

18. A combination as defined in claim 16, wherein said film transporting means further comprises resilient means for biasing said one film transporting member into engagement with the film and said actuating means comprises an eccentric turnable about said predetermined axis from a first to a second position to thereby disengage said one motion transmitting member from the film.

19. A combination as defined in claim 18, wherein said film transporting means further comprises second resilient means connected with said other film transporting member, said actuating means further comprising first displacing means cooperating with said second resilient means to disengage said other film transporting member in the first position of said eccentric, and second displacing means cooperating with said second resilient means to maintain said other film transporting member in engagement with the film in the second position of said eccentric.

References Cited
UNITED STATES PATENTS

| | | | |
|---|---|---|---|
| 3,246,944 | 4/1966 | Winkler | 352—91 |
| 3,425,776 | 2/1969 | Mayr et al. | 352—91OX |

JOHN M. HORAN, Primary Examiner

M. H. HAYES, Assistant Examiner

U.S. Cl. X.R.

352—173, 176